US010033713B2

(12) United States Patent
Mishra

(10) Patent No.: US 10,033,713 B2
(45) Date of Patent: Jul. 24, 2018

(54) SYSTEM AND METHOD FOR MANAGING KEYS FOR USE IN ENCRYPTING AND DECRYPTING DATA IN A TECHNOLOGY STACK

(75) Inventor: Anshuman M. Mishra, Erie, CO (US)

(73) Assignee: ORACLE INTERNATIONAL CORPORATION, Redwood City, CA (US)

( * ) Notice: Subject to any disclaimer, the term of this patent is extended or adjusted under 35 U.S.C. 154(b) by 364 days.

(21) Appl. No.: 13/529,454

(22) Filed: Jun. 21, 2012

(65) Prior Publication Data

US 2013/0343544 A1    Dec. 26, 2013

(51) Int. Cl.
*H04L 29/06* (2006.01)
*G06F 21/60* (2013.01)

(52) U.S. Cl.
CPC .......... *H04L 63/065* (2013.01); *G06F 21/602* (2013.01); *H04L 63/064* (2013.01)

(58) Field of Classification Search
CPC ...................................... H04L 63/064–63/065
USPC .................................................. 380/277–286
See application file for complete search history.

(56) References Cited

U.S. PATENT DOCUMENTS

| 7,082,536 | B2 * | 7/2006 | Filipi-Martin et al. | 713/171 |
|---|---|---|---|---|
| 8,230,222 | B2 * | 7/2012 | Celli et al. | 713/173 |
| 8,316,237 | B1 * | 11/2012 | Felsher et al. | 713/171 |
| 8,462,942 | B2 * | 6/2013 | Berggren et al. | 380/42 |
| 2003/0221097 | A1 * | 11/2003 | Nakano | G06F 21/10 713/150 |
| 2006/0095439 | A1 * | 5/2006 | Buchmann | G06Q 10/10 |
| 2008/0165958 | A1 * | 7/2008 | Matsushita | 380/44 |
| 2008/0258880 | A1 * | 10/2008 | Smith | G08B 21/10 340/286.02 |
| 2009/0060189 | A1 * | 3/2009 | Osajima et al. | 380/259 |
| 2010/0122088 | A1 * | 5/2010 | Oxford | 713/168 |
| 2011/0261962 | A1 * | 10/2011 | Dupuis et al. | 380/279 |
| 2011/0317834 | A1 * | 12/2011 | Chaturvedi et al. | 380/255 |
| 2012/0177201 | A1 * | 7/2012 | Ayling et al. | 380/278 |
| 2013/0044882 | A1 * | 2/2013 | Rich et al. | 380/279 |

OTHER PUBLICATIONS

Greg Goth, "Key Management Standards Hit the Fast Track", Sep. 2007, IEEE Distributed Systems Online, vol. 8, No. 9, pp. 1-4.*
Oracle Key Manager Overview, Nov. 2010, pp. 1-39.

(Continued)

Primary Examiner — John B King
Assistant Examiner — Carlos Amorin
(74) Attorney, Agent, or Firm — Kilpatrick Townsend & Stockton LLP

(57) ABSTRACT

In a technology stack including members provided in communication, a system and method are provided for managing keys for use in encrypting and decrypting data. The system comprises a key manager configured to define a group of members and to create at least one encryption key associated with the defined group, and a communications manager configured to transmit the at least one encryption key associated with the group to members in the group. Data encrypted by a member in the group using the at least one encryption key received by the member from the communications manager is transmitted to another member in the group for decryption using the at least one encryption key received by the another member from the communications manager.

20 Claims, 6 Drawing Sheets

(56) References Cited

OTHER PUBLICATIONS

Oracle Key Manager Version 2.x Security and Authentication White Paper, Nov. 2010, pp. 1-16.
Arshad Noor, Symmetric Key Management Systems, ISSA Journal, Feb. 2007, pp. 26-29.

* cited by examiner

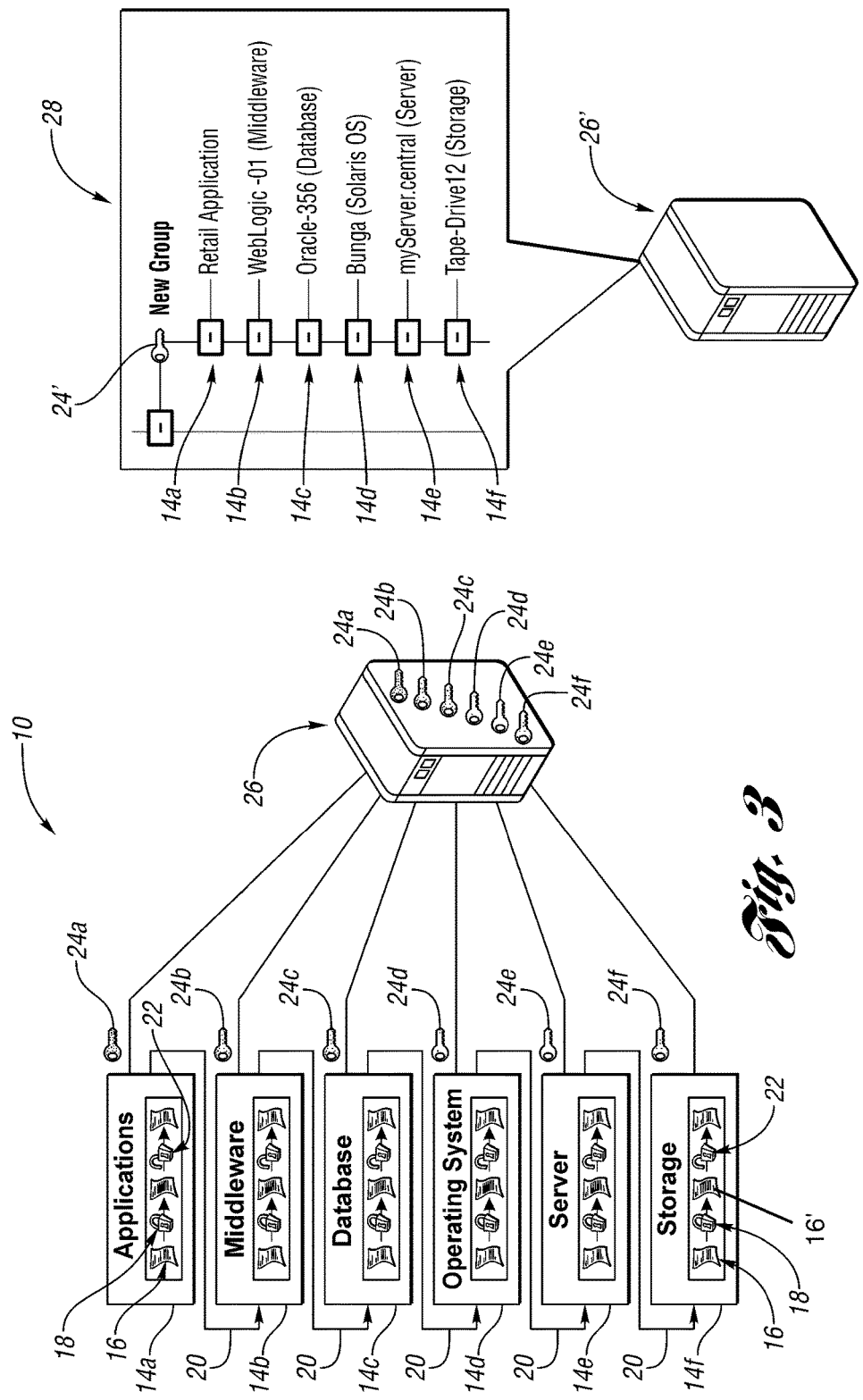

SYSTEM AND METHOD FOR MANAGING KEYS FOR USE IN ENCRYPTING AND DECRYPTING DATA IN A TECHNOLOGY STACK

TECHNICAL FIELD

The following relates to a system and method for managing keys for use in encrypting and decrypting data in a technology stack comprising a plurality of members.

BACKGROUND

Information technology deployment may be characterized as systems built using various tiers or components from an enterprise technology stack. An enterprise technology stack includes tiers or components such as applications, middleware, databases, virtual machines, operating systems, servers, networks, and storage.

At present, the process of securing confidential data via data encryption is handled in an ad-hoc manner at the component level. In one example, upon capturing data, applications may encrypt sensitive data, and later decrypt that data before it is transmitted to middle-ware over a secure channel. Middle-ware may also encrypt sensitive data and decrypt it before the data is stored in a database. A database itself may also encrypt sensitive data by encrypting the table space or column space. Thereafter, the data may be decrypted for reporting purpose or when needed by an application. Later, a backup application may perform a database backup and store an encrypted backup on a disk or tape. The storage appliance may also apply encryption via a file system (e.g., data sets or virtual pools) when storing data on disk. Similarly, a tape drive may also encrypt data before writing it on a tape cartridge.

Thus, confidential data is secured by applying encryption within a tier. When moving from one tier to another, encrypted data is first decrypted within the same tier and then passed on to the next tier over a secured channel where that data may be encrypted all over again. Consequently, the same data may be encrypted and decrypted multiple times as it moves from applications to storage, or otherwise between components, thereby introducing performance bottlenecks and increasing enterprise management complexity.

Indeed, in this current approach, an enterprise administrator deals with increased management complexity in terms of planning, configuring, and monitoring encryption end-points within each tier or component. Creating, securely storing, and managing encryption keys for these disparate encryption end-points is also a challenge.

Thus, there exists a need for an improved system and method for managing keys for use in encrypting and decrypting data in a technology stack to address these challenges. Such a system and method would implement a grouping mechanism within a centralized key management system (KMS). Such a KMS would not only securely create and store encryption keys, but also manage key life-cycles for the encryption end-points enrolled within a KMS groups.

SUMMARY

According to one embodiment disclosed herein, in a technology stack comprising a plurality of tiers provided in communication, each tier comprising at least one member, a system is provided for managing keys for use in encrypting and decrypting data. The system comprises a key manager configured to define a group of members from the plurality of tiers and to create at least one encryption key associated with the defined group, and a communications manager configured to receive requests for the at least one encryption key associated with the group from members in the group, and to transmit the at least one encryption key associated with the group to members in the group.

In this embodiment, a member in the group encrypts data using the at least one encryption key requested and received by the member from the communications manager and transmits the encrypted data to another member in the group. The another member in the group receives and decrypts the encrypted data using the at least one encryption key requested and received by the another member from the communications manager.

According to another embodiment disclosed herein, in a technology stack comprising a plurality of members provided in communication, a system is provided for managing keys for use in encrypting and decrypting data. The system comprises a key manager configured to define a group of members and to create at least one encryption key associated with the defined group, and a communications manager configured to transmit the at least one encryption key associated with the group to members in the group. Data encrypted by a member in the group using the at least one encryption key received by the member from the communications manager is transmitted to another member in the group for decryption using the at least one encryption key received by the another member from the communications manager.

According to still another embodiment disclosed herein, in a technology stack comprising a plurality of members provided in communication, a method is provided for managing keys for use in encrypting and decrypting data. The method comprises defining a group of members, and creating at least one encryption key associated with the defined group. The method further comprises providing the at least one encryption key associated with the group to members in the group, wherein the at least one encryption key is used by a member in the group to encrypt data transmitted to another member in the group, and the at least one encryption key is used by the another member in the group to decrypt encrypted data received from the member of the group.

A detailed description of these embodiments and accompanying drawings is set forth below.

BRIEF DESCRIPTION OF THE DRAWINGS

FIG. 3 is a graphical diagram of a technology stack including a plurality of members and a centralized key management system;

FIG. 4 is a graphical representation of a centralized key management system according to embodiments disclosed herein.

DETAILED DESCRIPTION

Figure 1:
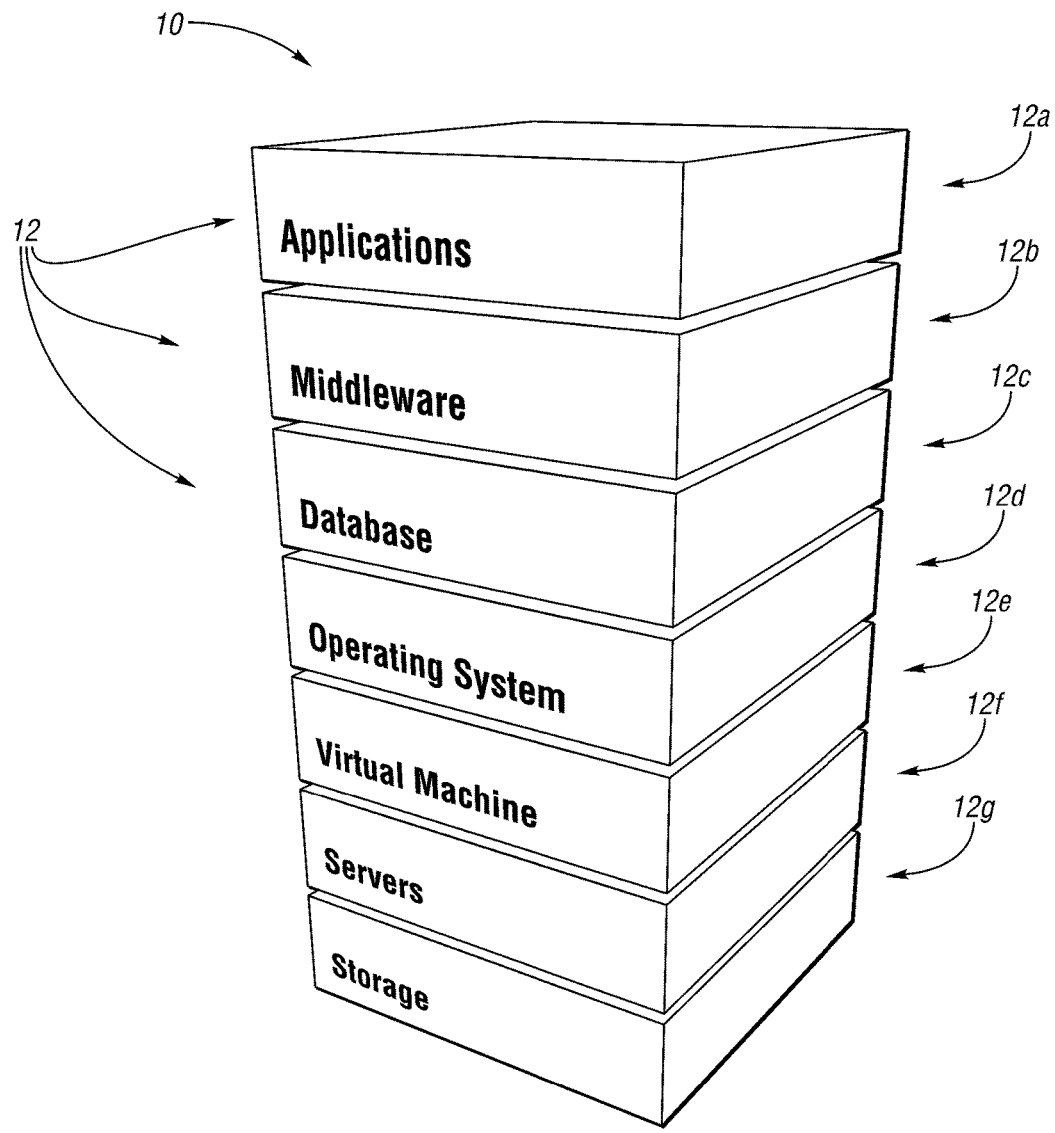
FIG. 1 is a graphical diagram of a technology stack including a plurality of tiers.

With reference to FIGS. 1-8, a system and method for managing keys for use in encrypting and decrypting data in a technology stack will be described. For ease of illustration and to facilitate understanding, like reference numerals have been used herein for similar components and features throughout the drawings.

As previously described, the process of securing confidential data via data encryption in an enterprise technology stack is currently handled at the tier or component level in an ad-hoc manner. That is, confidential data is secured by applying encryption within a tier. When moving from one tier to another, encrypted data is first decrypted within the same tier and then passed on to the next tier over a secured channel where that data may be encrypted all over again. Consequently, the same data may be encrypted and decrypted multiple times as it moves between components such as applications, middle-ware, databases, virtual machines, operating systems, servers, networks, and storage, thereby introducing performance bottlenecks and increasing enterprise management complexity.

As a result, there exists a need for an improved system and method for managing keys for use in encrypting and decrypting data in a technology stack to address these challenges. Such a system and method would implement a grouping mechanism within a centralized key management system (KMS). Such a KMS would not only securely create and store encryption keys, but also manage key life-cycles for the encryption end-points enrolled within KMS groups.

In accordance with the system and method disclosed herein, by grouping of data encryption end-points in a centralized key management system (KMS), sensitive data can be encrypted anywhere in an enterprise technology stack, and can also be decrypted as and when needed. As a result, multiple localized encryption and decryption as data flows through the enterprise technology stack is avoided.

In that regard, using a grouping mechanism implemented in the KMS, an enterprise administrator can create a group and enroll disparate encryption end-points (like applications, middle-ware, databases, virtual machines, operating systems, storage appliances, network switches, host bus adapters (HBA), tape drives, etc.) within the group. The enterprise administrator may then share an encryption key among the encryption end-point enrolled in the group. When encrypting data, an encryption end-point may fetch the shared key from the KMS. When decrypting the data, another end-point may request that the KMS return the shared key for the end-points enrolled in the same group and decrypt the encrypted data by applying the shared key. It should be noted that while the shared encryption/decryption key or keys are described herein as symmetric, such keys may be symmetric or asymmetric.

In one embodiment, a system administrator may choose to generate a unique key for each encryption end-point enrolled in a group. In this case all encryption end-points enrolled in a group may use their unique key for encryption and a set of keys for decrypting encrypted data. In another embodiment, an encryption end-point may be part of more than one group. Such an embodiment employs a mutual trust between groups before sharing keys across those groups. A trust model may be enforced by applying one or more policies on the groups.

More particularly, referring now to FIG. 1, a graphical diagram of a technology stack is shown, denoted generally by reference numeral (10). As seen therein, the stack (10) may comprise a plurality of tiers (12), which may comprise an application tier (12a), a middleware tier (12b), a database tier (12c), an operating systems tier (12d), a virtual machine tier (12e), a server tier (12f), a storage tier (12g) and/or other tiers.

Figure 2:
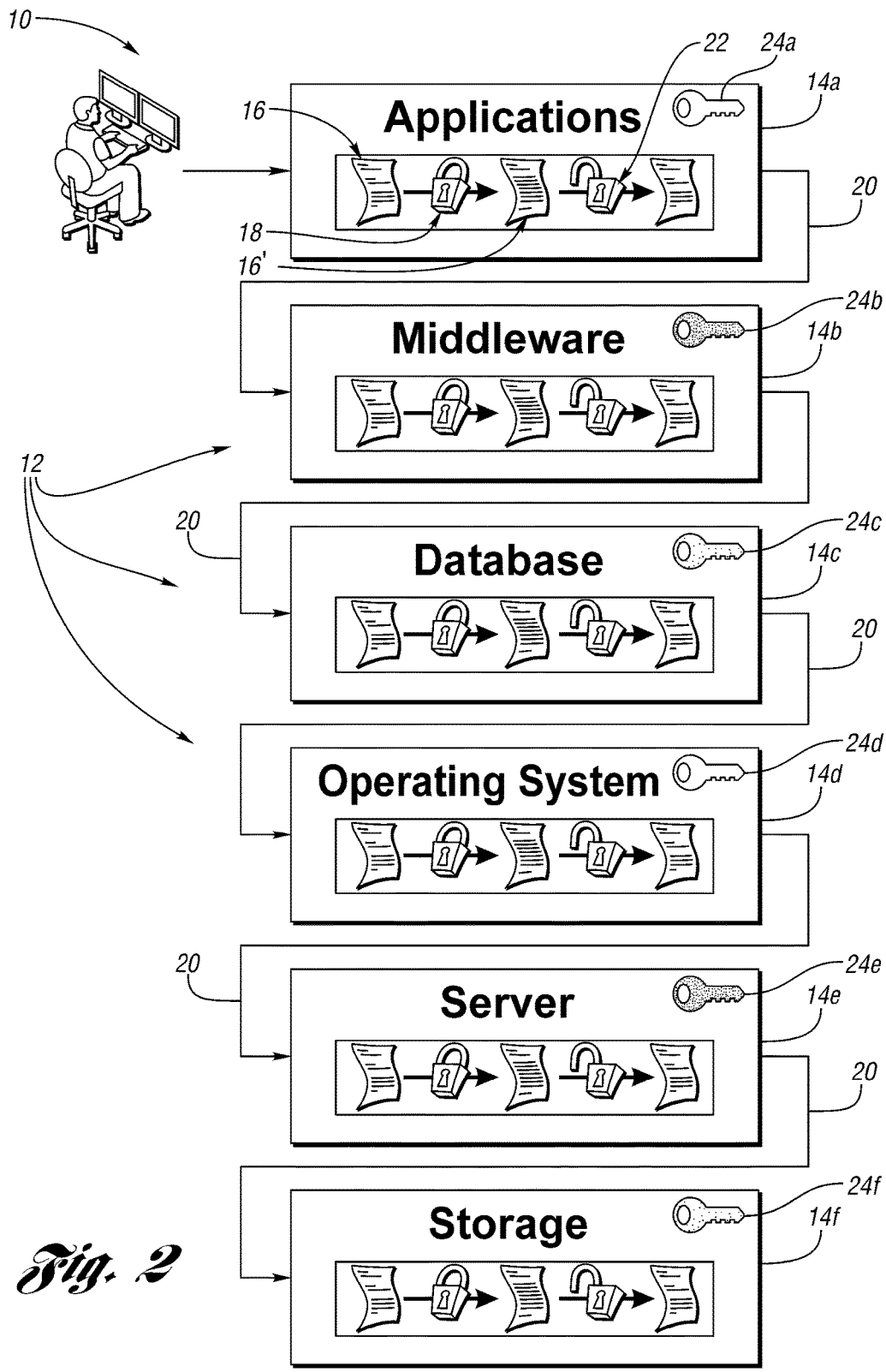
FIG. 2 is a graphical diagram of a technology stack including a plurality of members.

Each of the tiers (12a-g) of the technology stack (10) may itself comprise one or more members. In that regard, FIG. 2 shows a graphical diagram of a technology stack (10) that comprises a plurality of tiers (12), where each tier may include one or more members (14). As seen therein, the members (14) may comprise software applications (14a), middleware (14b), a switch, a database (14c), an operating system (14d), a server (14e), a storage device (14f), a virtual machine and/or other devices or systems.

With reference to FIGS. 1 and 2, data encryption is currently handled locally and in isolation within each tier (12a-f) or by each member (14a-f) of an enterprise technology stack (10). Where data (16) should be encrypted or decrypted is based primarily on the deployment environment. In that regard, as seen in FIGS. 1 and 2, each tier (12a-f) or member (14a-f) encrypts (18) data (16) as the encrypted data (16') enters or is transmitted (20) to the tier (12a-f), and also decrypts (22) the encrypted data (16') before the data (16) moves or is transmitted (20) to another tier (12a-f). Each tier (12a-f) or member (14a-f) also locally manages a different encryption key (24a-f). As a result, disparate encryption end-points, such as members (14a-f), do not operate in symphony across the technology stack (10), resulting in increased complexity of enterprise administration and/or performance bottlenecks.

Referring now to FIG. 3, a graphical diagram of a technology stack (10) is shown, including a plurality of members (14a-f) and a centralized key management system (KMS) (26). The KMS (26) provides for off-loading the secure creation, storing and management of encryption keys (24a-f) from the encryption/decryption end-points, such as members (14a-f), to a central location. The KMS (26) thus provides security, scalability and high-availability for data encryption/decryption and encryption keys (24a-f).

However, even with the KMS (26) shown in FIG. 3, each tier (12a-f) (see FIG. 1) or member (14a-f) still encrypts (18) data (16) as the encrypted data (16') enters or is transmitted (20) to the tier (12a-f), and also decrypts (22) the encrypted data (16') before the data (16) moves or is transmitted (20) to another tier (12a-f). As a result, disparate encryption/decryption end-points, such as members (14a-f) again do not operate in symphony across the technology stack (10).

Referring next to FIG. 4, a graphical representation of one embodiment of a centralized key management system (KMS) (26') is shown directed to the problems described above. As seen therein, those problems can be solved by employing a KMS (26') that uses grouping of encryption/decryption end-points, such as members (14a-f) (see FIG. 3). More specifically, a new group (28) is created within KMS (26'), which may comprise a retail application (14a), middleware (14b) such as WebLogic-01, a database system (14c) such as Oracle-365, a Solaris Operating System (OS) (14d) such as Bunga, a server (14e) such as myServer.central, a storage device (14f) such as Tape-Drive12 and/or any number of other encryption/decryption end-points.

Still referring to FIG. 4, when any encryption/decryption end-point, which may be a database, tape drive, operating system (OS), application or any other, is enrolled with the KMS (26'), that end-point may be placed in the group (28). Moreover, all such encryption/decryption end-points (14a-f) in the group (28) share a common master encryption key (24'). In such a fashion, disparate encryption/decryption end-points (14a-f) may be grouped and share a common encryption key (24') within a centralized KMS (26'), thereby allowing them to interoperate in symphony to encrypt/decrypt data.

Figure 5:
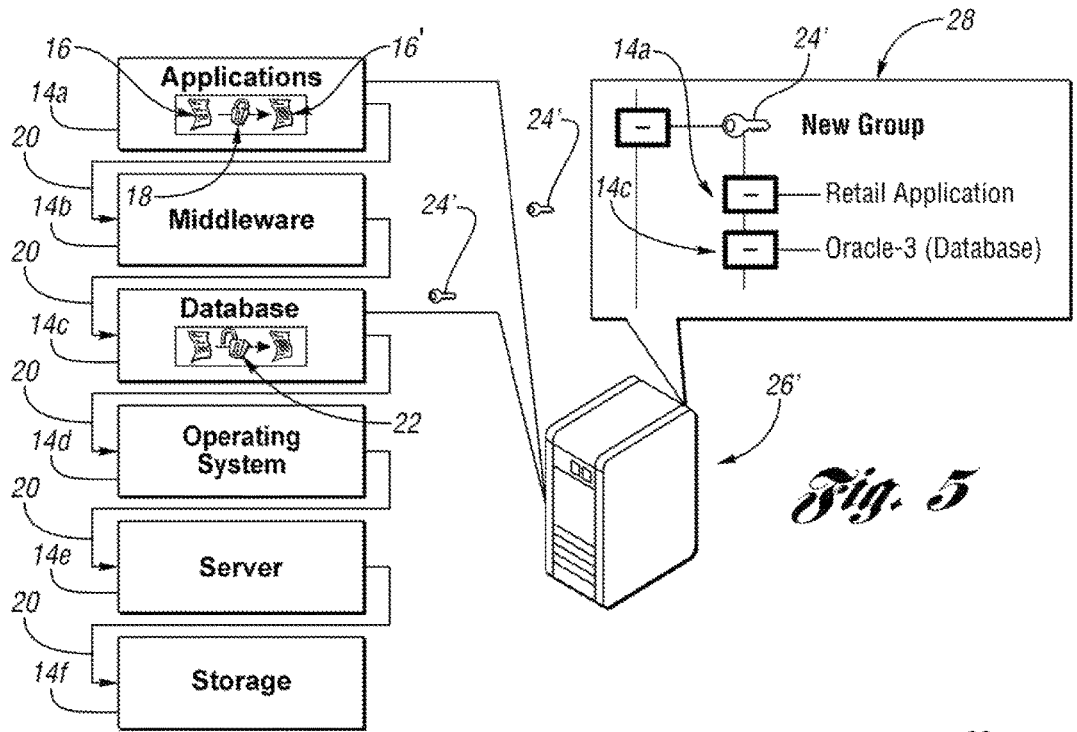
FIG. 5 is a graphical representation of a technology stack including a plurality of members and a centralized key management system according to an embodiment disclosed herein.

Referring now to FIG. 5, a graphical representation of a technology stack (10) is shown including a plurality of members (14a-f) and an embodiment of a centralized key management system (KMS) (26'). As seen therein, a group (28) at the KMS (26') may comprise a retail application (14a) and a database (14c), such as Oracle-3, which share a common encryption key (24'). The retail application (30) encrypts (18) data (16) using the group encryption key (24'). Encrypted data (16') moves (20) through the middleware tier or member (14b). The database (14c) decrypts (22) the data (16) as necessary using the group encryption key (24'). In the remainder of the tiers or members of technology stack (10), such as at operating system (OS) (14d), server (14e) and storage (14f), the data (16') remains encrypted.

Figure 6:
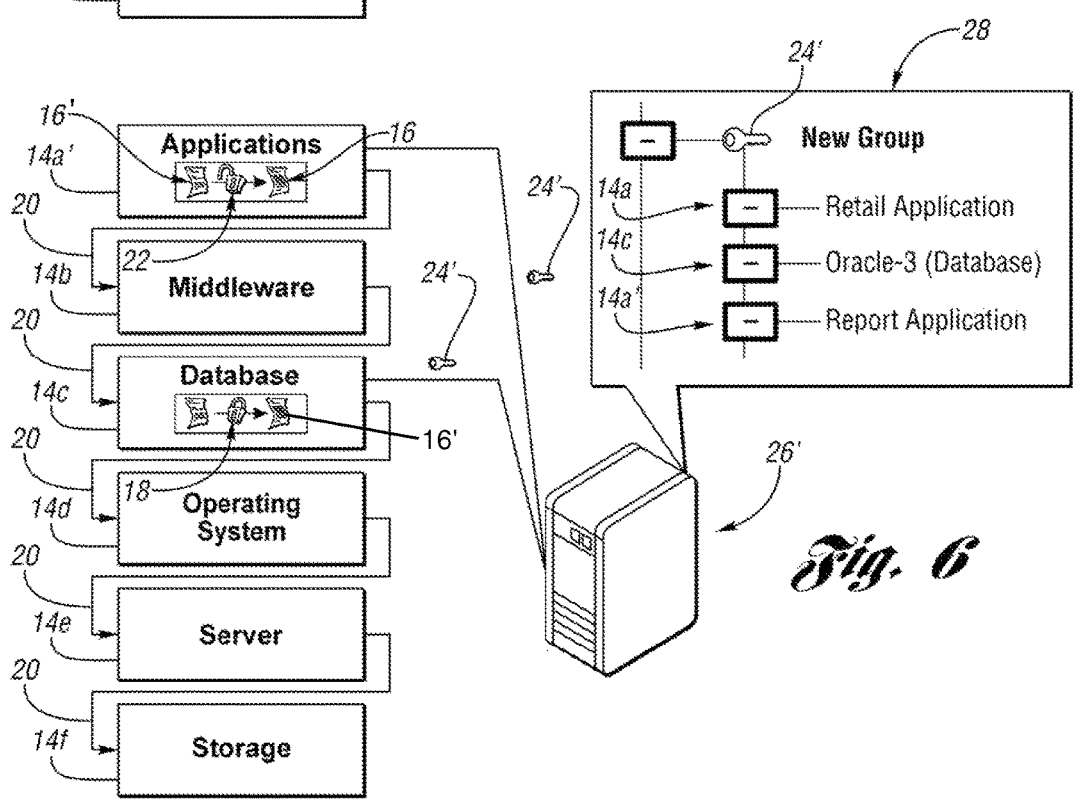
FIG. 6 is a graphical representation of a technology stack including a plurality of members and a centralized key management system according to another embodiment disclosed herein.

Alternatively, as seen in FIG. 6, which shows a graphical representation of a technology stack (10) including a plurality of members (14a-f) and a centralized key management system (KMS) (26') according to another embodiment, plaintext (i.e., unencrypted) data (16) moves (20) through a retail application (14a) and middleware (14b) to database (14c). The database (14c) encrypts (18) the data (16) using the common encryption key (24') of the group (28). Encrypted data (16') may move (20) through other tiers or members of the technology stack (10), such as OS (14d), server (14e), and storage (14f). Thereafter, a report application (14a') that has been enrolled along with the retail application (14a) and the database (14c) in the group (28) may read the encrypted data (16') from the database (14c) and decrypt (22) the data (16) using the group (28) key (24').

Figure 7:
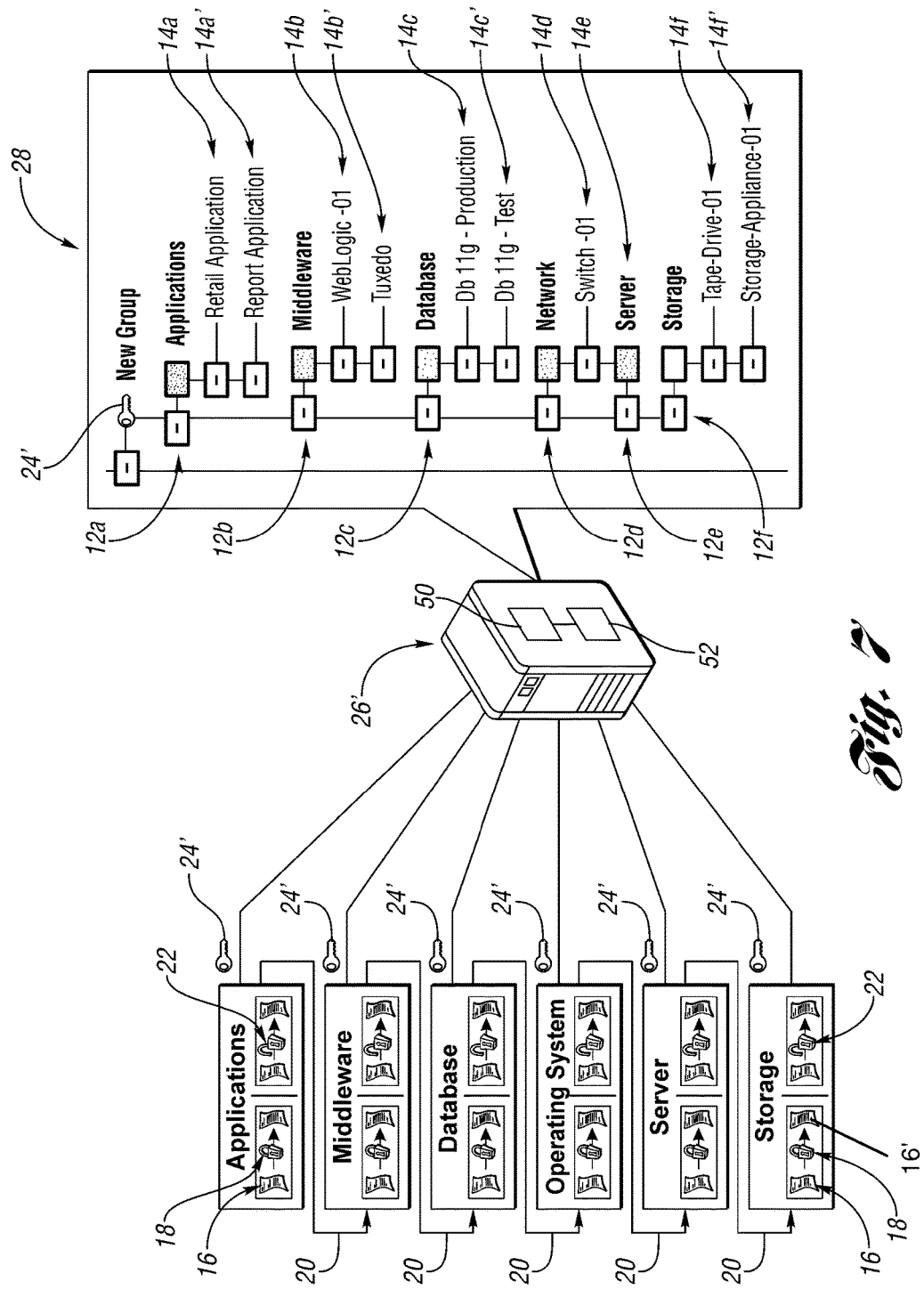
FIG. 7 is a graphical representation of a technology stack including a plurality of members and a centralized key management system according to still another embodiment disclosed herein.

Referring now to FIG. 7, a graphical representation of a technology stack (10) is shown, including another embodiment of a centralized key management system (KMS) (26'). As seen therein, a new group (28) within KMS (26') may comprise a plurality of tiers (12a-f) each having one or more members. In particular, an applications tier (12a) may comprise a retail application (14a) member, as well as a report application (14a'). A middleware tier (12b) may comprise a WebLogic-01 member (14b) and a Tuxedo member (14b'), while a database tier (12c) may comprise a Db 11g—Production member (14c) and a Db 11g—Test member (14c'). A network tier (12d) may comprise a switch-01 (14d), and a server tier (12e) may comprise a server (14e). Finally, a storage tier (12f) may comprise a Tape-Drive-01 member (14f) and a Storage-Appliance-01 member (14f').

As described previously in connection with FIGS. 5 and 6, each member (14a-f') in the group (28) shown in FIG. 7 shares a common encryption key (24'). Such grouping of encryption/decryption end-points (14a-f') with a shared master key (24') provides great flexibility in determining where and/or when data (16) is encrypted (18) and decrypted (22), as well as which member (14a-f) should provide for such encryption/decryption.

Figure 8:
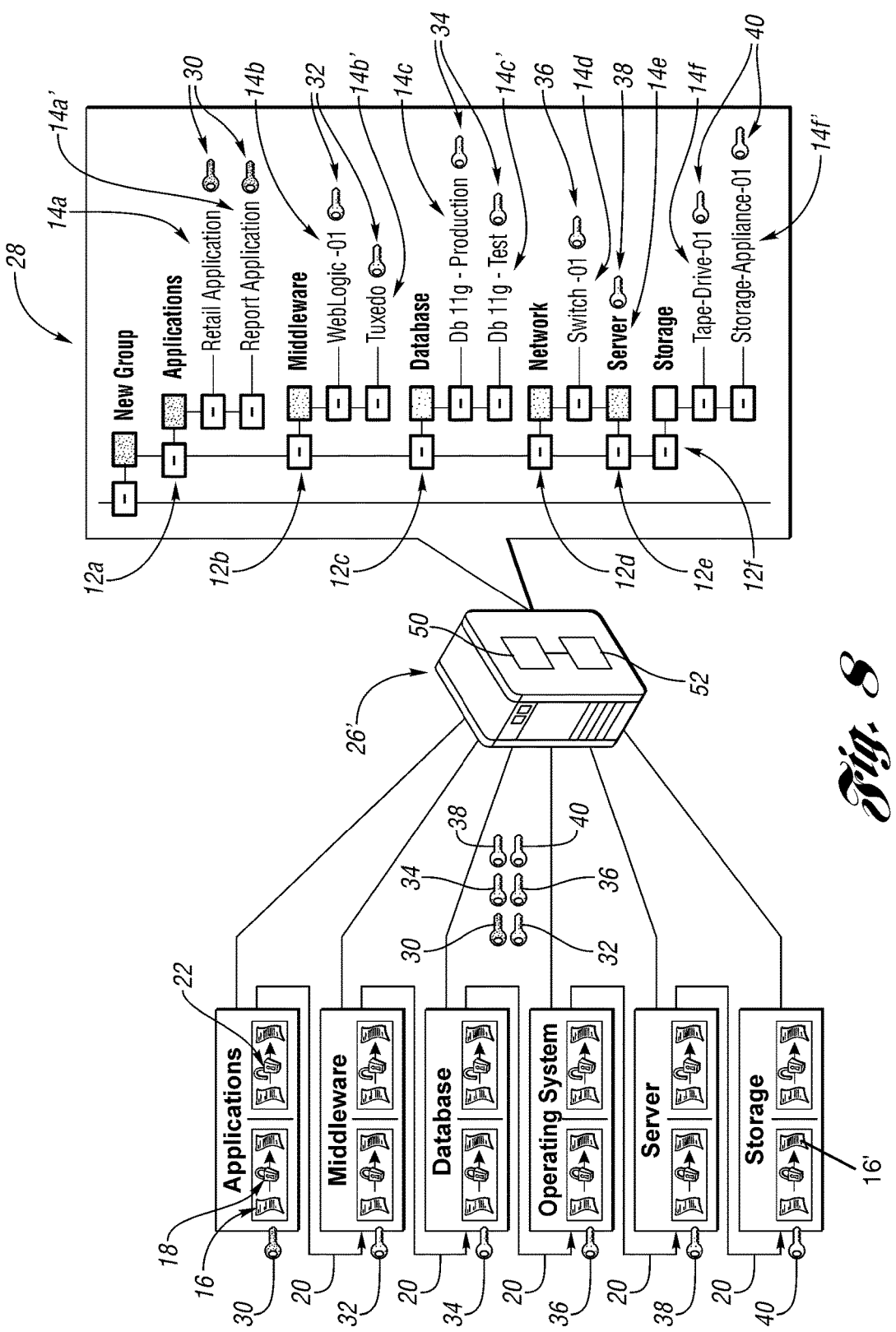
FIG. 8 is a graphical representation of a technology stack including a plurality of members and a centralized key management system according to yet another embodiment disclosed herein.

FIG. 8 is a graphical representation of a technology stack (10) including a centralized key management system (KMS) (26') according to yet another embodiment. As seen therein, a new group (28) within KMS (26') may comprise a plurality of tiers (12a-f) each having one or more members. In particular, an applications tier (12a) may comprise a retail application (14a) member, as well as a report application (14a'). A middleware tier (12b) may comprise a WebLogic-01 member (14b) and a Tuxedo member (14b'), while a database tier (12c) may comprise a Db 11g—Production member (14c) and a Db 11g—Test member (14c'). A network tier (12d) may comprise a switch-01 (14d), and a server tier (12e) may comprise a server (14e). Finally, a storage tier (12f) may comprise a Tape-Drive-01 member (14f) and a Storage-Appliance-01 member (14f').

FIG. 8 illustrates an alternative with respect to the encryption key (24') of FIGS. 5-7. In particular, as seen in FIG. 8, each member (14a-f') in the group (28) has its own unique encryption key (30, 32, 34, 36, 38, 40). In such a fashion, each encryption/decryption end-point (14a-f') uses its own unique key (30, 32, 34, 36, 38, 40) for encrypting (18) the data (16), and applies one or more of the keys (30, 32, 34, 36, 38, 40) in order to decrypt (22) the encrypted data (16'). In that regard, the KMS (26') could supply or provide a group of keys (30, 32, 34, 36, 38, 40) to a member (14a-f') so that such a member (14a-f') could apply any or all such keys (30, 32, 34, 36, 38, 40) to encrypted data (16) in order to determine the appropriate key (30, 32, 34, 36, 38, 40) for decrypting the data (16). Alternatively, as an example, the KMS (26') could supply or provide to a storage device (14f) one of the keys (30, 32, 34, 36, 38 40) associated with a particular application (14a') based on an identification of that application (14a').

FIGS. 5-8 thus illustrate a technology stack (10) comprising a plurality of tiers (12a-f) provided in communication, where each tier (12a-f) comprises at least one member (14a-f'). As well, a system is provided for managing keys (24', 30, 32, 34, 36, 38, 40) for use in encrypting (18) and decrypting (22) encrypted data (16'). In that regard, as seen in FIGS. 7 and 8, the KMS (26') may comprise a key manager (50) which may be configured to define a group (28) of members (14a-f') from the plurality of tiers (12a-f) and to create at least one encryption key (24', 30, 32, 34, 36, 38, 40) associated with the defined group (28). In that regard, the key manager (50) may comprise appropriate software, hardware or both to perform such operations.

KMS (26') may also comprise a communications manager (52) provided in communication with the key manager (50). The communications manager (52) may be configured to receive requests for the at least one encryption key (24', 30, 32, 34, 36, 38, 40) associated with the group (28) from members (14a-f') in the group (28), and to transmit the at least one encryption key (24', 30, 32, 34, 36, 38, 40) associated with the group (28) to members (14a-f') in the group (28). Here again, communications manager (52) may comprise appropriate software, hardware or both to perform such operations.

A member (14a-f') in the group (28) encrypts data (16) using the at least one encryption key (24', 30, 32, 34, 36, 38, 40) requested and received by the member (14a-f') from the communications manager (52) and transmits (20) the encrypted data (16') to another member (14a-f') in the group (28). That other member (14a-f') in the group (28) receives (20) and decrypts (22) the encrypted data (16') using the at least one encryption key (24', 30, 32, 34, 36, 38, 40) requested and received by the another member (14a-f') from the communications manager (52).

As previously described in connection with FIG. 8, the at least one encryption key (24', 30, 32, 34, 36, 38, 40) associated with the group (28) may comprise a plurality of encryption keys (30, 32, 34, 36, 38, 40), and each one of such a plurality of encryption keys (30, 32, 34, 36, 38, 40) may be associated with one tier (12a-f) of members (14a-f) of the group (28). It should also be noted that the data (16) that is encrypted (18) and decrypted (22) by members (14a-f) in the group (28) may comprise either data-at-rest (e.g., bulk data stored or resident at a member (14a-f), such as a database (14c)) or data-in-motion (e.g., data transmitted to/from a member (14a-f)). In such a fashion, data-at-rest such as bulk data stored at a data center or in a database and accessible by multiple partners and/or mobile applications may be encrypted for protection against attack. It should also be noted that encryption of data-in-motion is distinguished from the encryption employed with a secure channel established for data transmission.

As previously described in connection with FIGS. 5 and 6, and with continuing reference to FIGS. 5-8, a member (14a-f) may transmit (20) the encrypted data (16) to another member (14a-f) through at least one intermediate member (14a-f) without decryption (22) of the encrypted data (16') at the at least one intermediate member (14a-f). In that regard, the members (14a-f) may be configured to encrypt (18) and decrypt (22) data (16) using the at least one key (24', 30, 32, 34, 36, 38, 40) only when acting as an endpoint of communication with another member (14a-f). To that end, the members (14a-f) may be configured with appropriate software, hardware or both to provide intelligence for determining when and/or where such encryption/decryption should occur, as well as which member (14a-f) should provide for such encryption/decryption.

Referring still to FIGS. 5-8, a method is also provided for managing keys (24', 30, 32, 34, 36, 38, 40) for use in encrypting (18) and decrypting (22) data (16) in a technology stack (10) comprising a plurality of members (14a-f) provided in communication. In particular, that method may comprise defining a group (28) of members (14a-f), and creating at least one encryption key (24', 30, 32, 34, 36, 38, 40) associated with the defined group (28). That method may also comprise providing the at least one encryption key (24', 30, 32, 34, 36, 38, 40) associated with the group (28) to members (14a-f) in the group (28). According to such a method, the at least one encryption key (24', 30, 32, 34, 36, 38, 40) may be used by a member (14a-f) in the group (28) to encrypt (18) data (16) transmitted (20) to another member (14a-f) in the group (28), and the at least one encryption key (24', 30, 32, 34, 36, 38, 40) may be used by that other member (14a-f) in the group (28) to decrypt (22) encrypted data (16') received from the member (14a-f) of the group (28).

It should be noted that tiers (12a-f) and encryption/decryption end-points or members (14a-f) illustrated in FIGS. 5-8 are exemplary only, any other tiers (e.g., a network tier) and/or members (e.g., virtual storage devices, virtual servers, virtual machines and/or other virtualization) may also or alternatively be employed. As well, while the tiers (12a-f) and/or members (14a-f) shown in FIGS. 5-8 are depicted in serial communication, any other communication topology known in the art (e.g., star, ring, bus, line, mesh, tree, and/or others) may also or alternatively be employed. As well, the tiers (12a-f) and/or the members (14a-f) depicted in FIGS. 5-8 may be part of a distributed network and may be located at disparate sites.

As is apparent from the foregoing description, an improved system and method are provided for managing keys for use in encrypting and decrypting data in a technology stack. The system and method may implement a grouping mechanism within a centralized key management system (KMS). The KMS may securely create and store encryption keys, and may also manage key life-cycles for the encryption end-points enrolled within KMS groups.

While certain embodiments of a system and method for managing keys for use in encrypting and decrypting data in a technology stack have been illustrated and described herein, they are exemplary only and it is not intended that these embodiments illustrate and describe all those possible. Rather, the words used herein are words of description rather than limitation, and it is understood that various changes may be made without departing from the spirit and scope of the following claims.

What is claimed is:

1. A system for managing keys for use in encrypting and decrypting data, the system comprising:

a plurality of member components configured to operate within an execution of a technology stack, and in communication over a network, each member component comprising at least one of an application, a middleware component, a network component a database component an operating system, a virtual machine, a server, or a storage component, and a server provided in communication with the plurality of member components over the network, the server comprising memory having stored therein a key manager configured to define a group of member components, the group comprising the plurality of member components, classify the plurality of member components into a plurality of tiers based on the functionality of the member component within the technology stack, and to create a plurality of unique encryption keys, each encryption key associated with only one of the plurality of tiers of the defined group, and a communications manager configured to receive requests for at least one encryption key from member components in the group, and to transmit at least one encryption key to the member components in the group, the communications manager further configured to:

receive from a first member component in the group a first request for an encryption key associated with the tier of the first member component;

in response to the first request from the first member for the encryption key, determine that the first member is associated with a first tier of the defined group and transmit a first encryption key associated with the first tier to the first member;

receive a second request from a second member component within the defined group for a first encryption key, the second member component within a second tier, the second request identifying the first member component or the first tier within the defined group; and in response to the second request, provide to the second member component in the defined group the first encryption key associated with the first tier of the defined group, wherein providing to the second member component within the defined group the first encryption key associated with the first tier of the defined group comprises:

(a) determining, based on the second request from the second member component, that the second request is a request for an encryption key to allow the second member component to decrypt data received from the first member component;

(b) determining, based on the second request from the second member component, that the data received by the second member component from the first member component was received through a third intermediate member component within the defined group, wherein the third intermediate member is not associated with the first tier or the second tier within the defined group; and (c) in response to (a) determining that the second request is a request for an encryption key to allow the second member component to decrypt data received from the first member component, and (b) determining that the data received by the second member component from the first member component was received through a third intermediate member component, providing the first encryption key associated with the first tier of the defined group to the second member component.

2. The system of claim 1 wherein providing the first encryption key to the second member component comprises providing a group including the plurality of all of the unique encryption keys to the second member component.

3. The system of claim 1 wherein at least one of the first member component and the second member component belongs to another group defined by the key manager comprising member component from at least two of the plurality of tiers.

4. The system of claim 1 wherein providing the first encryption key to the second member component comprises identifying data corresponding to of the first member component within the second request, and providing only the first encryption key to the second member component in response to the second request.

5. The system of claim 1 wherein each of the plurality of member components is configured to encrypt and decrypt data using the plurality of encryption keys only when the member component is an endpoint of communication with another member component.

6. The system of claim 1 wherein the second member component in the defined group belongs to a tier from the plurality of tiers different than the first tier of the first member component in the defined group.

7. A method for managing keys for use in encrypting and decrypting data, the method comprising:
   defining, by a server, a group of member components provided in communication over a network, the group comprising a plurality of member components, wherein each of the plurality of members is a component within a technology stack, each member component comprising at least one of an application, a middleware component, a network component, a database, an operating system, a virtual machine, a server, or a storage component;
   classifying, by the server, the plurality of member components of the defined group into a plurality of tiers based on the functionality of the member component within the technology stack;
   creating, by the server, a plurality of unique encryption keys, each encryption key associated with only one of the plurality of tiers of the defined group;
   receiving, by the server, a first request from a first member component within the defined group for an encryption key, the first member component within a first tier;
   in response to the first request, providing, by the server, to the first member component within the defined group a first encryption key associated with the first tier of the defined group;
   receiving, by the server, a second request from a second member component within the defined group for an encryption key, the second member component within a second tier, the second request identifying the first member component or the first tier within the defined group; and
   in response to the second request, providing, by the server, to the second member component in the defined group the first encryption key associated with the first tier of the defined group, wherein providing to the second member component within the defined group the first encryption key associated with the first tier of the defined group comprises:
   (a) determining, by the server, based on the second request from the second member component, that the second request is a request for an encryption key to allow the second member component to decrypt data received from the first member component;
   (b) determining, by the server, based on the second request from the second member component, that the data received by the second member component from the first member component was received through a third intermediate member component within the defined group, wherein the third intermediate member is not associated with the first tier or the second tier within the defined group; and
   (c) in response to (a) determining that the second request is a request for an encryption key to allow the second member component to decrypt data received from the first member component, and (b) determining that the data received by the second member component from the first member component was received through a third intermediate member component, providing the first encryption key associated with the first tier of the defined group to the second member component.

8. The method of claim 7 wherein providing the first encryption key to the second member component comprises providing a group including the plurality of all of the unique encryption keys to the second member component.

9. The method of claim 7 wherein providing the first encryption key to the second member component comprises identifying data corresponding to the first member component within the second request, and providing only the first encryption key to the second member component in response to the second request.

10. The method of claim 7 wherein the second member component in the defined group uses the first encryption key associated with the first tier to decrypt encrypted data received over the network from the first member component, and wherein the encrypted data is transmitted to the second member through the third at least one intermediate member of the defined group without decryption of the encrypted data at the at least one intermediate member component.

11. The method of claim 7 wherein each of the plurality of member components of the defined group is configured to encrypt and decrypt data using the plurality of encryption keys only when the member component is an endpoint of communication with another member component of the defined group.

12. The method of claim 7 wherein the second member component in the defined group belongs to a tier from the plurality of tiers different than the first tier of the first member component in the defined group.

13. The method of claim 7, wherein the first member component and the second member component comprise different technology stack components operating within the same computing infrastructure.

14. The method of claim 7, further comprising:
defining, by the server, a second group of member components, the second group comprising a second plurality of member components within a second technology stack;
classifying, by the server, the second plurality of member components of the second group into a second plurality of tiers based on the functionality of the member components within the second technology stack; and
creating, by the server, a second plurality of unique encryption keys, each encryption key in the second plurality associated with only one of the second plurality of tiers of the second group.

15. The method of claim 14, wherein the first member component is a member component of a first tier of the defined group and of a first tier of the second defined group, wherein the first tier of the defined group has a different unique encryption key than the first tier of the second defined group.

16. The method of claim 15, wherein providing to the first member component within the defined group the encryption key associated with the first tier of the defined group comprises:
determining, by the server, whether the first request from the first member component is associated with the defined group or with the second defined group; and
in response to determining that the first request is associated with the defined group, transmitting the first encryption key associated with the first tier of the defined group to the first member component.

17. The method of claim 7, wherein providing to the first member component within the defined group the first encryption key associated with the first tier of the defined group comprises:
determining, by the server, the associated tier of the first member component within the defined group: and
in response to determining that the first member component is associated with the first tier of the defined group, retrieving, by the server, the first encryption key associated with the first tier.

18. A non-transitory processor-readable medium comprising processor-readable instructions configured to cause one or more processors to:
define a group of member components provided in communication over a network, the group comprising a plurality of member components, wherein each of the plurality of members is a component within a technology stack, each member component comprising at least one of an application, a middleware component, a network component, a database, an operating system, a virtual machine, a server, or a storage component;
classify the plurality of member components of the defined group into a plurality of tiers based on the functionality of the member component within the technology stack;
create a plurality of unique encryption keys, each encryption key associated with only one of the plurality of tiers of the defined group;

receive a first request from a first member component within the defined group for an encryption key, the first member component within a first tier;
in response to the first request, provide to the first member component within the defined group a first encryption key associated with the first tier of the defined group,
receive a second request from a second member component within the defined group for an encryption key, the second member component within a second tier, the second request identifying the first member component or the first tier within the defined group; and
in response to the second request, provide to the second member component in the defined group the first encryption key associated with the first tier of the defined group, wherein providing to the second member component within the defined group the first encryption key associated with the first tier of the defined group comprises:
  (a) determining based on the second request from the second member component, that the second request is a request for an encryption key to allow the second member component to decrypt data received from the first member component;
  (b) determining based on the second request from the second member component, that the data received by the second member component from the first member component was received through a third intermediate member component within the defined group, wherein the third intermediate member is not associated with the first tier or the second tier within the defined group; and
  (c) in response to (a) determining that the second request is a request for an encryption key to allow the second member component to decrypt data received from the first member component, and (b) determining that the data received by the second member component from the first member component was received through a third intermediate member component, providing the first encryption key associated with the first tier of the defined group to the second member component.

19. The non-transitory processor-readable medium of claim 18, wherein the first member component is a member component of a first tier of the defined group and of a first tier of the second defined group, wherein the first tier of the defined group has a different unique encryption key than the first tier of the second defined group.

20. The non-transitory processor-readable medium of claim 19, wherein providing to the first member component within the defined group the encryption key associated with the first tier of the defined group comprises:
determining whether the first request from the first member component is associated with the defined group or with the second defined group; and
in response to determining that the first request is associated with the defined group, transmitting the first encryption key associated with the first tier of the defined group to the first member component.

* * * * *

UNITED STATES PATENT AND TRADEMARK OFFICE
CERTIFICATE OF CORRECTION

PATENT NO. : 10,033,713 B2
APPLICATION NO. : 13/529454
DATED : July 24, 2018
INVENTOR(S) : Mishra Page 1 of 1

It is certified that error appears in the above-identified patent and that said Letters Patent is hereby corrected as shown below:

In the Claims

In Column 10, Line 51, in Claim 10, after "third" delete "at least one".

In Column 11, Line 37, in Claim 17, delete "group:" and insert -- group; --, therefor.

Signed and Sealed this
Second Day of March, 2021

Drew Hirshfeld
*Performing the Functions and Duties of the
Under Secretary of Commerce for Intellectual Property and
Director of the United States Patent and Trademark Office*